July 5, 1938.　　　　　S. BERGSTEIN　　　　　2,122,510
APPARATUS FOR MAKING SEALED PACKAGES
Filed Oct. 8, 1935　　　　7 Sheets-Sheet 1
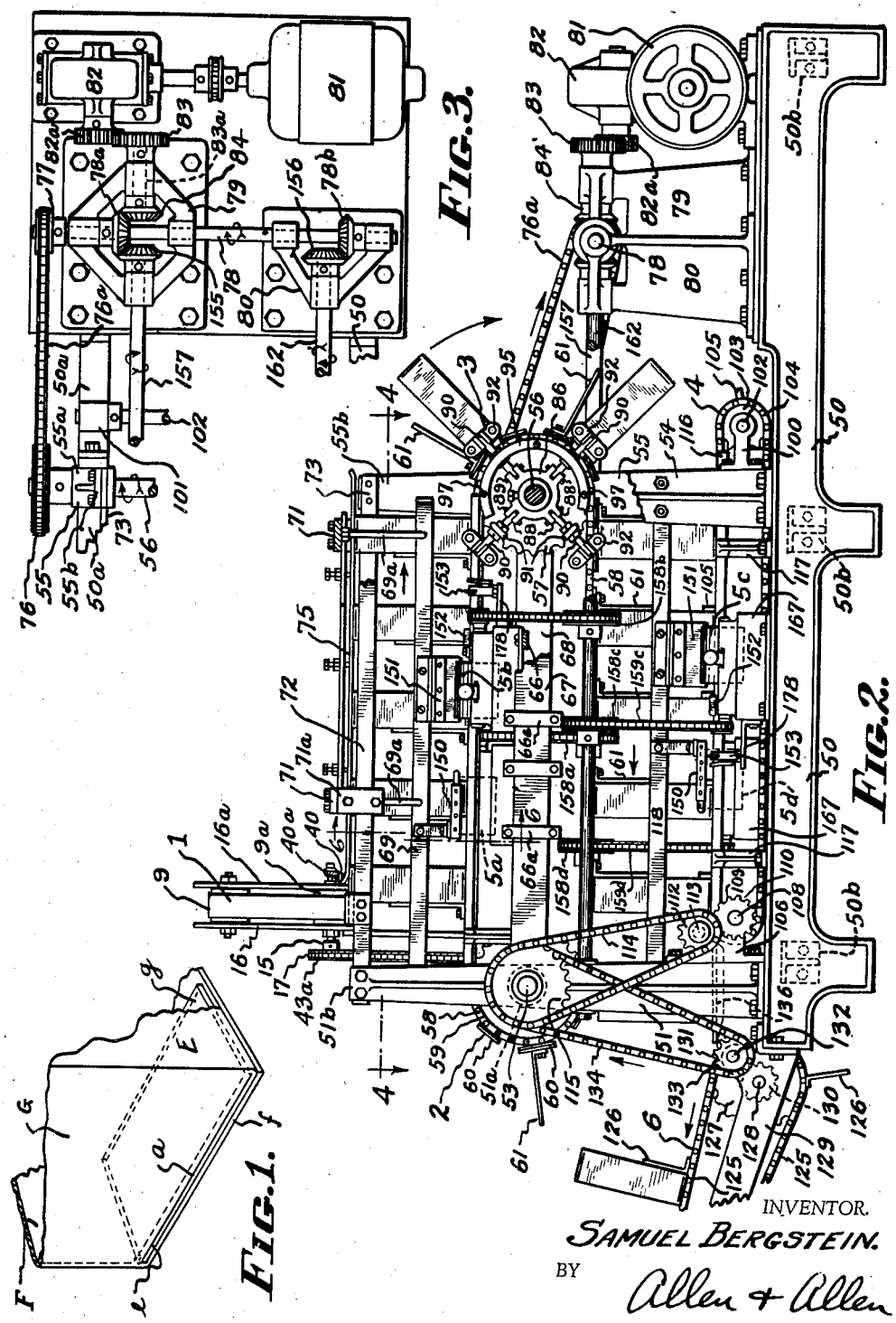
INVENTOR.
SAMUEL BERGSTEIN.
BY Allen & Allen
ATTORNEYS.

July 5, 1938.   S. BERGSTEIN   2,122,510
APPARATUS FOR MAKING SEALED PACKAGES
Filed Oct. 8, 1935   7 Sheets-Sheet 2

INVENTOR.
SAMUEL BERGSTEIN.
Allen & Allen
ATTORNEYS.

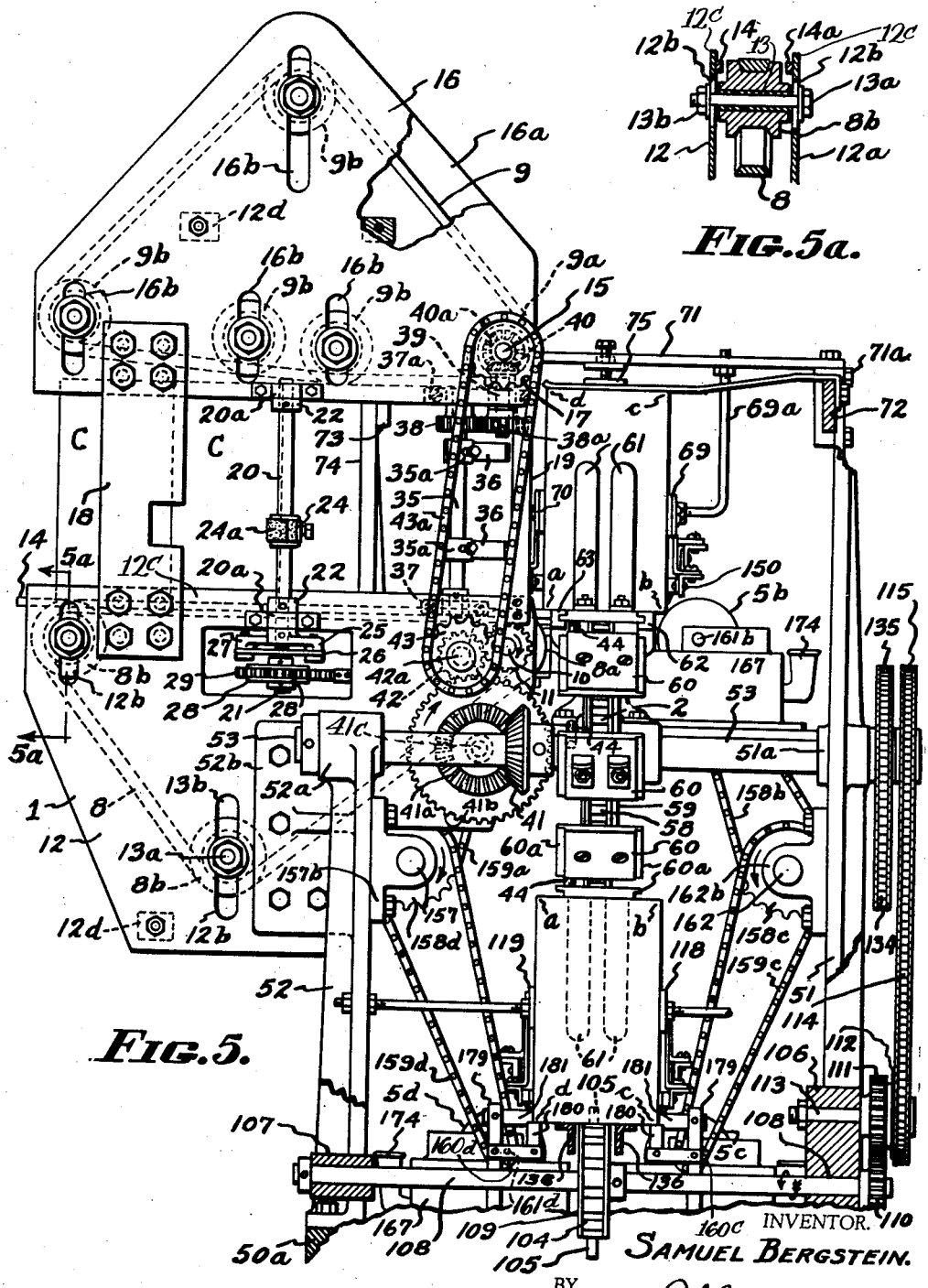

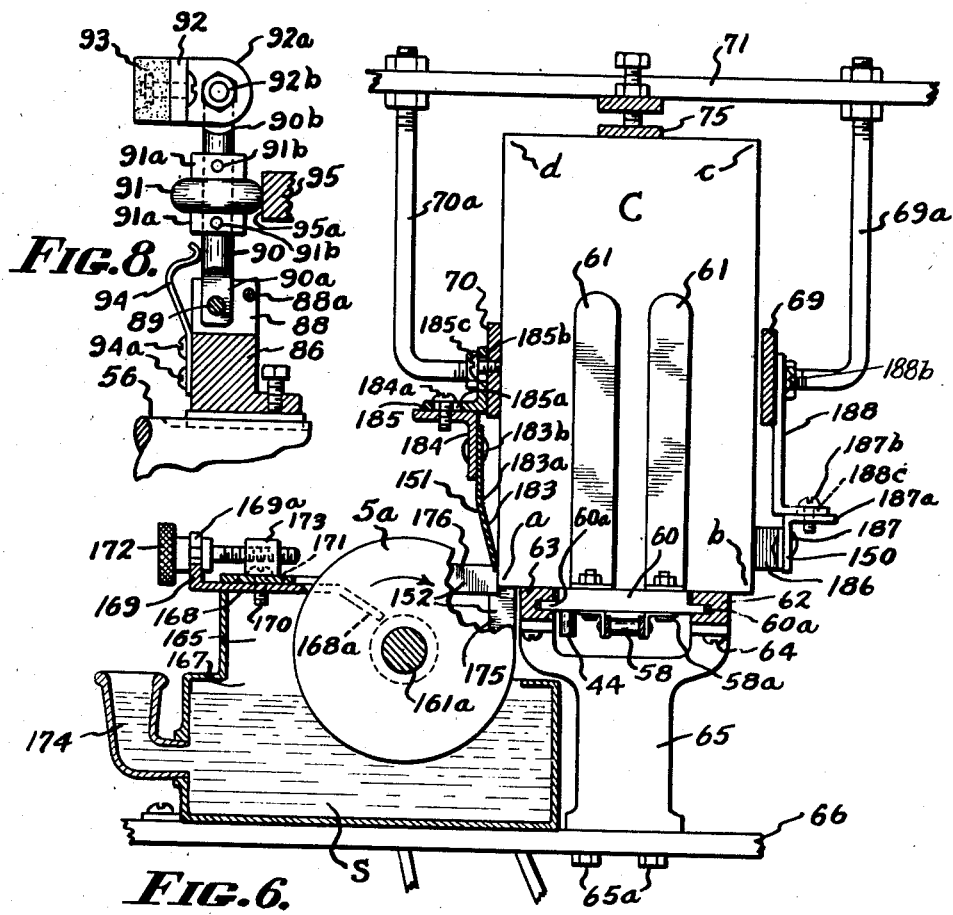
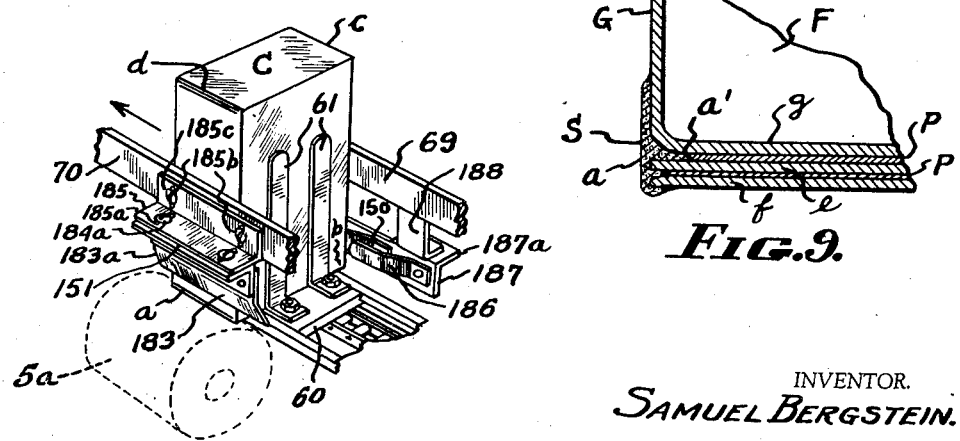

July 5, 1938.  S. BERGSTEIN  2,122,510
APPARATUS FOR MAKING SEALED PACKAGES
Filed Oct. 8, 1935  7 Sheets-Sheet 5
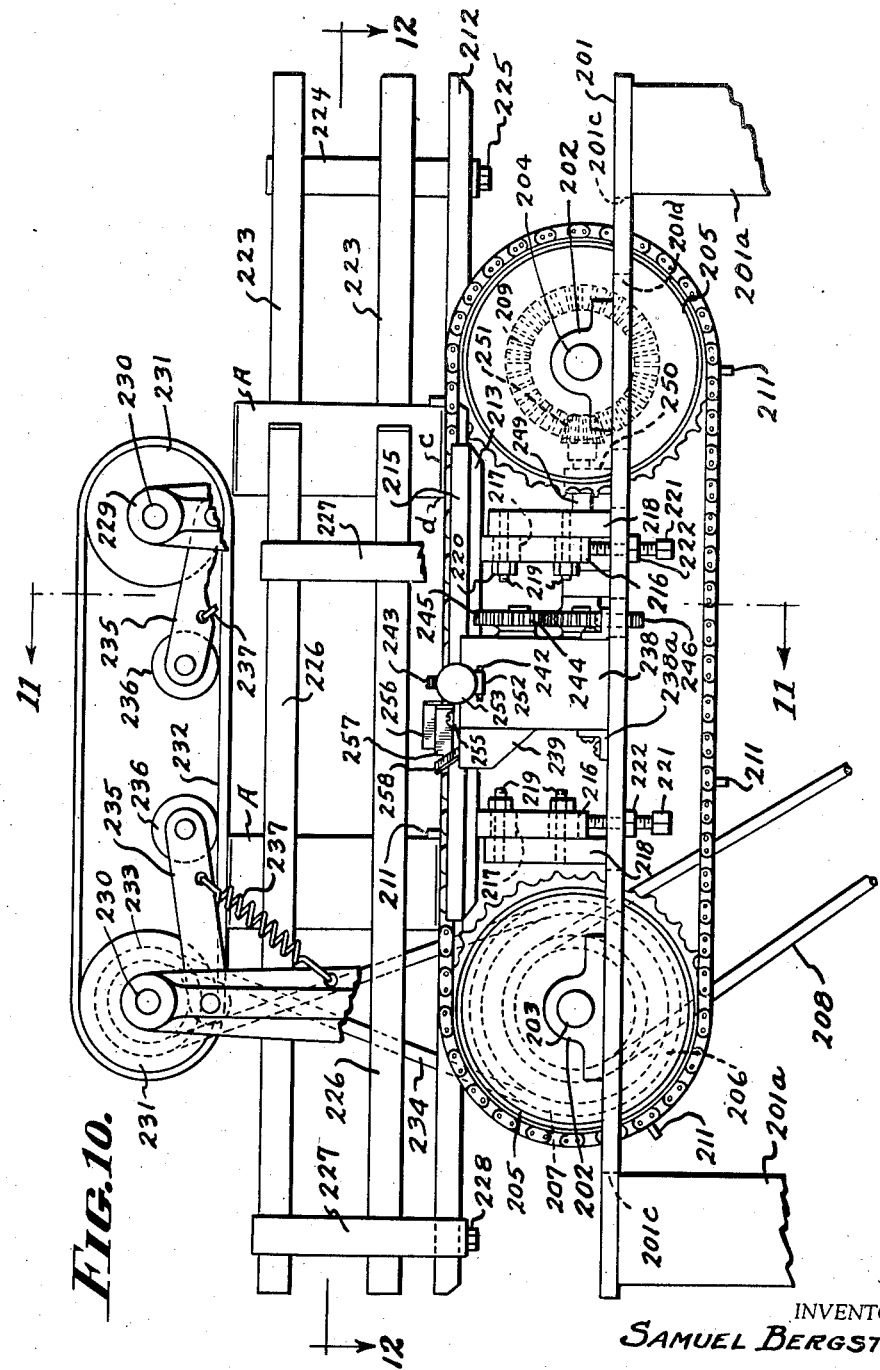
INVENTOR.
SAMUEL BERGSTEIN.
BY
Allen & Allen
ATTORNEYS.

July 5, 1938.  S. BERGSTEIN  2,122,510
APPARATUS FOR MAKING SEALED PACKAGES
Filed Oct. 3, 1935  7 Sheets-Sheet 7
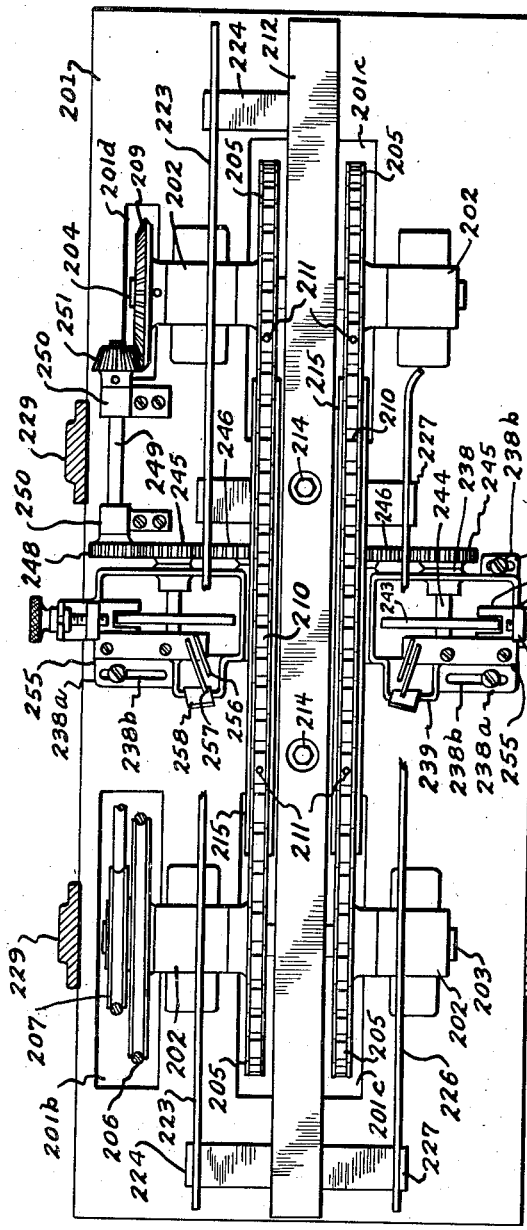
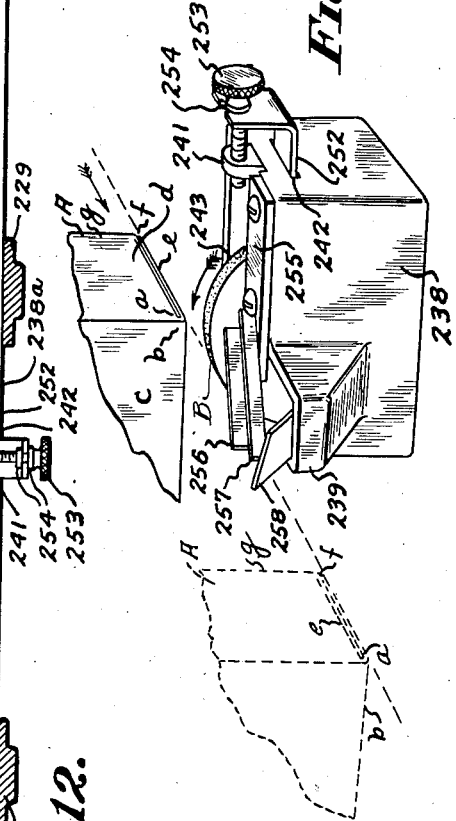
INVENTOR.
SAMUEL BERGSTEIN.
BY Allen & Allen
ATTORNEYS.

Patented July 5, 1938

2,122,510

UNITED STATES PATENT OFFICE 2,122,510

APPARATUS FOR MAKING SEALED PACKAGES

Samuel Bergstein, Cincinnati, Ohio, assignor to Edna May Bergstein and Robert Morris Bergstein, as trustees Application October 8, 1935, Serial No. 44,082

12 Claims. (Cl. 91—51)

This invention relates to machines for hermetically sealing packages subsequent to the setting up, filling and sealing of the packages in the regular manner.

This application relates to improved mechanism for hermetically sealing packages in accordance with the method set forth in my copending application, Ser. No. 603,064, filed April 4th, 1932, and is a continuation in part thereof, and a division in so far as one type of sealing apparatus shown herein is transferred from said copending application.

My invention relates to mechanism and apparatus for sealing cartons after they are set up, filled and sealed as an auxiliary and supplemental hermetic sealing operation. Such cartons are made, filled and closed by automatic machinery, a well known example being a carton in which the blank is folded and secured in tubular form, with four lateral walls, each having a flap at each end, two opposite flaps being folded in, a third flap having adhesive applied to its lower side, being folded in on the two flaps, and the fourth flap having adhesive applied to its lower side and being folded in on the third flap to form each end of the carton. In the ordinary method one end thus is formed, the carton is filled, and then the other end is formed, completing the closure. My improved mechanism is adapted for use, however, on all types of cartons, regardless of the machinery used prior to the hermetic sealing operation. This usual method of sealing is adequate where the contents are of a nature which will not result in their seeping or sifting through minute openings, and where hermetic sealing is not required. It is well known to those familiar with the art of making paper board cartons that although the paper board itself may be rendered impermeable by use of cellulose acetate or other substance, a carton made of such material is itself not impermeable nor air-tight. This is because of the ever present difficulty of sealing the end flaps without crevices and pin holes which communicate with the interior of the carton and render it unfit for use as a container for many substances, such as foods, etc., wherein deterioration of quality or flavor results from exposure to air.

It is therefore an object of my invention to provide mechanism for applying a coating or film of sealing medium to the hermetically critical portions of the carton, usually the corners of the sealed end flaps. A further object is to provide means whereby this sealing of the cartons may be accomplished by automatic apparatus, performing the operation in a rapid, neat and efficient manner and requiring a minimum of attention by the operator.

Another object is the provision of hermetic sealing apparatus, with which cartons which are to receive this auxiliary hermetic sealing treatment are carried on a conveyor belt in which the apparatus for applying the hermetic sealing treatment is more effective if the cartons are properly positioned and spaced on the conveyor, and to automatic mechanism for spacing, feeding and positioning the cartons on the conveyor.

A further object is the provision of hermetic edge-sealing mechanism having auxiliary mechanism effective on the side of the carton opposite that on which the hermetic sealing medium is applied for co-operating with said first noted mechanism for insuring a proper application of the sealing medium.

Other objects and advantages will appear from a description of the invention in conjunction with the drawings, wherein:

Figure 1 is a fragmentary perspective view of a carton showing one of the hermetically critical edges.

Fig. 2 is a side elevation of my preferred machine with parts broken away and certain parts shown in section.

Fig. 3 is a fragmentary plan view showing the arrangement of driving mechanism.

Fig. 5 is a left end elevation with parts broken away and certain parts shown in section.

Fig. 5a is a section along the line 5a—5a of Fig. 5.

Fig. 6 is a fragmentary section along the line 6—6 of Fig. 2.

Fig. 7 is a fragmentary perspective view of a carton passing through my machine.

Fig. 8 is a sectional view taken through one of the arms of my device for inverting the cartons.

Fig. 9 is an enlarged fragmentary section of a carton to which the sealing medium has been applied.

Fig. 10 is a side elevation of a modified form of my apparatus.

Fig. 12 is a section along the line 12—12 of Fig. 10 and,

Fig. 13 is a perspective view of apparatus for applying the sealing medium.

Figures 4, 4A:
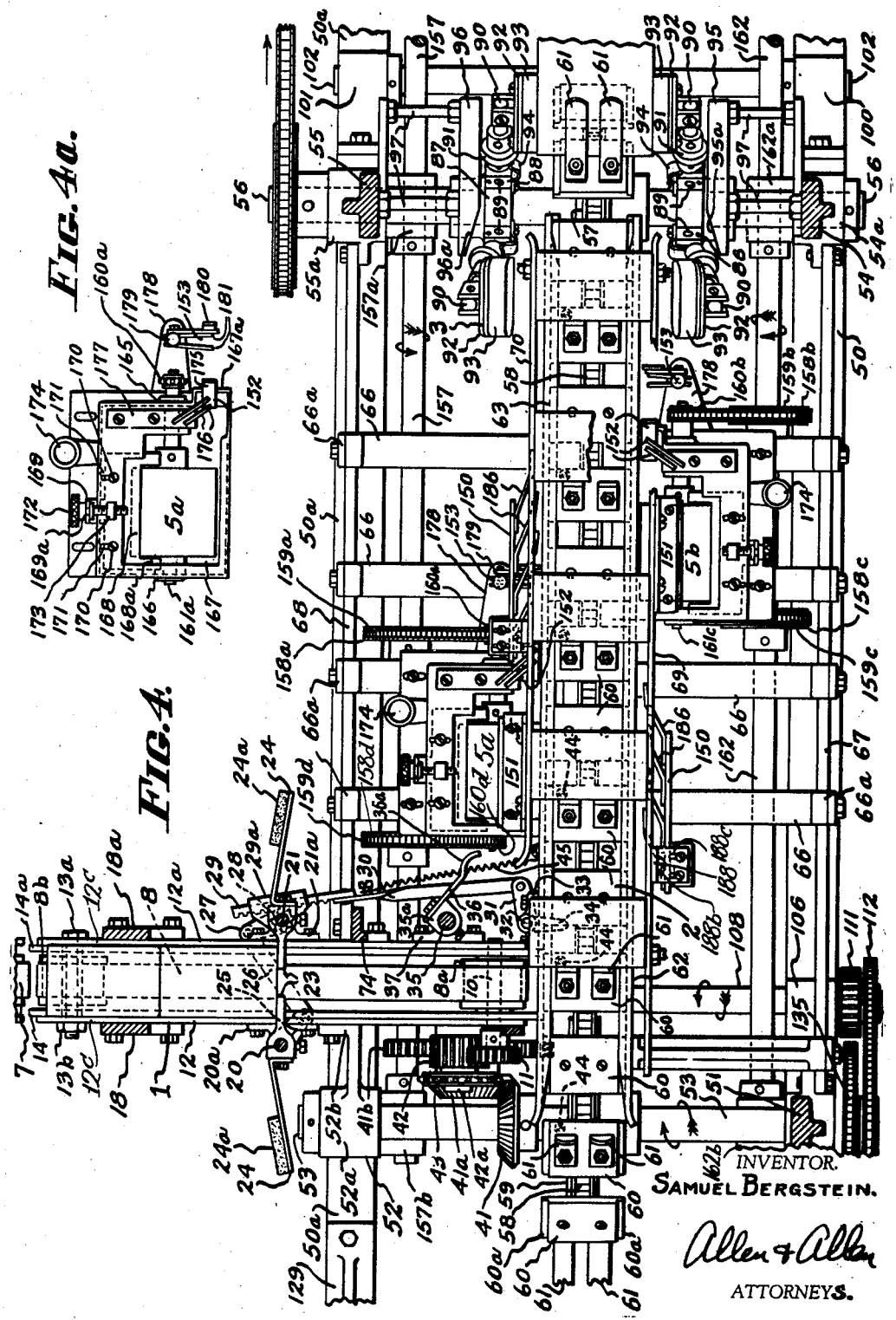
Fig. 4 is an enlarged sectional plan view taken along the line 4—4 of Fig. 2.
Fig. 4a is a plan view of a sealing roller.
Figure 11:
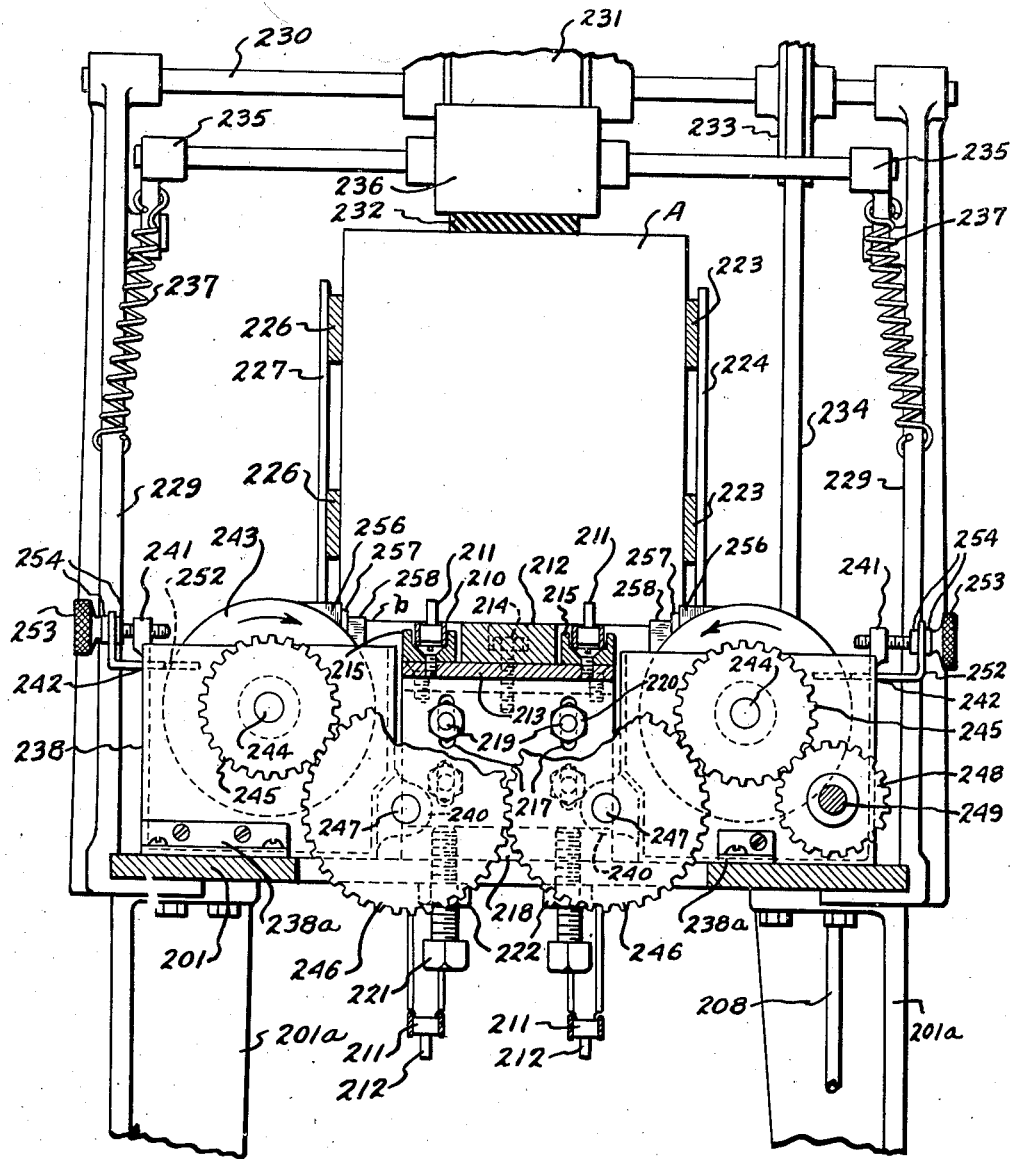
Fig. 11 is a section along the line 11—11 of Fig. 10.

Referring to Figs. 2 and 4, my preferred machine consists essentially of a feeding or loading device generally indicated by the numeral 1, for feeding the cartons in timed relation to an upper conveyor indicated at 2, a turn-over or inverting device 3 for inverting and placing the cartons on a lower conveyor 4, and a series of rollers adjacent the conveyors for applying the sealing medium, said rollers being indicated at 5a, 5b, 5c, and 5d, in the sequence in which they perform their respective function upon a carton. Although not an essential part of my invention, I have shown a third or take-off conveyor generally indicated at 6 for receiving the finished cartons and carrying them to a packing table or store room. These devices, together with suitable supporting means and driving mechanism by which they are operated in coordinated relationship, comprise my preferred form of machine as shown in Figs. 2 to 8, inclusive.

*Feeding mechanism*

As seen in Figs. 4 and 5, the feeding device has a pair of continuously running belts 8 and 9 arranged to receive cartons from a conveyor or other source 7. The lower belt 8 is driven from pulley 8a, fixed to shaft 10, which has journaled bearings in a pair of side plates 12 and 12a, and and has fixed at its outer end a driven gear 11. Belt 8 also runs over adjustable idler pulleys 8b, which as seen in Fig. 5a, are rotatably mounted on sleeves 13 held between the side plates 12 and 12a by bolts 13a and nuts 13b, said bolts extending through adjustment slots 12b of the side plates. The side plates have portions 12c, which extend above the surface of the belt 8 forming a guideway for the cartons. Also affixed to the side plates a pair of rails 14 and 14a extend beyond the limits of belt 8 to support the cartons during their travel from source 7 onto belt 8 and from belt 8 onto upper conveyor 2. The side plate 12 is supported by bolting to the flange 52b extending from the upright frame member 52. Side plate 12a is supported by bolting to upright member 74. Suitable spacing members or blocks 12d may be interposed between the side plates for holding them in rigid fixed relation.

Fixed to shaft 15 pulley 9a drives the upper belt 9 running over idler pulleys 9b. The shaft 15 is journaled in side plates 16 and 16a, and has a driven sprocket 17 fixed at one end. Plates 16 and 16a are supported by members 18 and 18a, which extend from the lower plates 12 and 12a. Plate 16 is also supported at its inner end by the member 19, while plate 16 is given additional support by bolting to the upright frame member 74. Slots 16b permit adjustment of the pulleys 9b, which are mounted in the manner already described in conjunction with pulleys 8b.

Vertical shafts 20 and 21, arranged on opposite sides of the belts 8 and 9, are journaled in pairs of bearing brackets 20a and 21a, respectively, and are held in position therein by collars 22. A pair of fingers or gates 23, extending inwardly across the path of the cartons, are fixed to the shafts 20 and 21 and carry outward extending arms 24 with pads 24a of resilient material attached at their outer ends. Fixed to the lower end of shaft 20, lever arm 25 is operably connected by link 26 to a similar lever arm 27 fixed to shaft 21. Also fixed to shaft 21, pinion gear 28 meshes with a rack 29 arranged to reciprocate in suitable guiding means 29a. The rack 29 is attached to a twisted bar 30, which, in turn, is pivotally connected to a lever arm 31 fastened to the lower end of a short shaft 32 journaled in bearing bracket 33, and having lever arm 34 fastened at its upper end. It will be thus understood that movement of lever arm 34 will result in rotation of the shafts 20 and 21 with the gates 23 and their outward extending arms 24.

Clamped to the vertical shaft 35, a pair of collars 35a carry arms or fingers 36, having curved end portions 36a. The shaft 35 is journaled in bearing brackets 37 and 37a and has fixed at its upper end a spur gear 38 meshing with gear 38a fixed to shaft 39, which is journaled in bearing bracket 37a and has at its upper end a miter gear 40 meshing with miter gear 40a, fixed to shaft 15.

The feed mechanism is driven from a miter gear 41 fixed to shaft 53, which itself is driven, as will be described, in conjunction with the upper conveyor. The gear 41 drives miter gear 41a, which rotates fixedly with spur gear 41b on stud 41c and drives the smaller gear 42 mounted on stud 42a. Fixedly rotating with the gear 42, sprocket 43 carries chain 43a running over upper sprocket 17, thus driving shaft 15, pulley 9a, belt 9 and the fingers 36 through the gear train described therewith. Also driven by the gear 42, is the gear 11 on shaft 10, which has pulley 8a to drive belt 8.

Referring to Fig. 4, the cartons entering the device between belts 8 and 9 will be retarded by the gates 23, and as the upper belt 9 is not arranged to definitely contact the cartons at this point they will rest upon belt 8 which will continue to travel or slide beneath them in readiness to carry the cartons forward when the gates are opened. When one of the studs 44, carried by the upper conveyor 2, contact lever arm 34, it is carried to the right to effect movement of the gates 23 and arms 24 which are arranged to travel through an arc of approximately 90 degrees. Thus the gates 23 will be at right angles to the position shown, and will permit passage of the first awaiting carton. The second awaiting carton is not permitted to pass because of the action of arms 24 which revolve with the gates and grasp the said carton tightly between the pads 24a to arrest its movement along the belt. A tension spring 45 is arranged to return the gates to the position shown after the studs 44 have released lever arm 34. With this arrangement, one carton will be released with each operation of the gates, and each carton will be in timed relation with belts 8 and 9 for proper entry upon the conveyor 2.

The fingers 36 rotate in counter-clockwise direction and in timed relation with conveyor 2 for insuring proper loading of the cartons thereon. If for any reason a carton is late in its travel along the belts 8 and 9, it will be contacted by the portion 36a of the fingers, which, being positively driven, will advance the carton sufficient to correct the inaccuracy of timing. The fingers also serve to assist the cartons completely onto the conveyor.

*Upper conveyor*

Referring to Figs. 2 and 4, a front frame member 50 and rear frame member 50a are held in fixed relation by transverse members 50b. Secured at the left end of the frame members a front upright 51 and rear upright 52 have bearings 51a and 52a, respectively, in which the shaft 53 is journaled. Upright members 54 and 55 to the right have bearings 54a and 55a, in which a shaft 56 is journaled.

Fixedly rotating with shaft 56, sprocket 57 carries the upper conveyor chain 58, which runs over a left-hand sprocket 59 fixed on shaft 53. As best seen in Fig. 6, the chain 58 is of the type having at desired intervals special side plates formed with extending lugs or ears 58a, to which are fastened by screws or bolts a series of flat rectangular conveyor plates 60, having a portion of their outer edges milled away to form tongues 60a. To each alternate conveyor plate, I provide two upright pieces 61, and on the under side of these same alternate plates, a stud 44 projects downwardly to effect timed operation of the feed mechanism as already described.

During its travel between left-hand sprocket 59 and right-hand sprocket 57, the conveyor assembly is carried in alignment by side guides 62 and 63, which are of channel-shaped cross section, and provide sliding fit for the tongues 60a of the conveyor plates. As shown in Fig. 6, the guides 62 and 63 may be supported by attaching with screws 64 to suitable supports 65, which are held by screws 65a to transverse bars or beams 66, these beams having at their outer ends clamping means 66a for fastening to the frame members or rails 67 and 68.

The chief function of this upper conveyor is to transport the cartons past the rollers 5a and 5b which, as later described, apply my sealing medium to the two lower edges a and b, as seen in Fig. 5. While traveling on this conveyor, the cartons rest upon the plates 60 and are carried forward by the uprights 61. Also, the conveyor assembly is somewhat narrower than the width of the cartons so as to provide necessary clearance for the sealing rollers.

Side guides 69 and 70 are provided for guiding the cartons in alignment with the conveyor and sealing rolls, and as seen in Fig. 6, these guides are supported from the bent rods 69a and 70a depending from transverse bars 71, which have at their outer ends clamping means 71a for securing to longitudinal frame members 72 and 73. Member 72 is fastened at its left end by screws to the upper end 51b of the upright 51; at its right end it is fastened to a similar extension (not shown) of the upright 54. Member 73 is attached at its right end by screws to upper end 55b of upright 55 and at its left end to the upright 74. An adjustable pressure bar 75 is arranged to bear against the tops of the cartons and prevent vertical displacement when they contact the sealing rollers 5 and 5a.

For driving this upper conveyor a sprocket 76 is fixed to shaft 56 and carries chain 76a, running over small sprocket 77 mounted on countershaft 78. Countershaft 78 is journaled in multiple bearing brackets 79 and 80, and has a fixed bevel gear 78a, from which it is driven by motor 81, acting through reduction unit 82, gears 82a and 83, shaft 83a and miter gear 84.

Movement of the conveyor chain 58 causes rotation of left-hand sprocket 59 and shaft 53 which, as already described, has fixed thereon bevel gear 41 for driving the feed mechanism.

*Inverting mechanism*

Fixedly rotating with the shaft 56, wheels 86 and 87 have spurs 88 arranged in pairs as shown in Fig. 2. Extending through each pair of the spurs, pins 89 provide pivoted bearings for the arms 90. Referring to Fig. 8, the arms are of round stock upon which cam rollers 91 are rotatably mounted between collars 91a fixed by pins 91b. The arms have flattened end portions 90a and 90b. Plates 92, having lugs 92a, are clamped by bolts 92b to the ends 90b of the arms. Pads 93 of resilient material such as soft rubber are fastened to the plates. Springs 94, fastened to the wheels by screws 94a, tend to hold the arms 90 in their extreme outward position, which is limited by pins 88a mounted in the spurs 88.

Referring to Figs. 2 and 4, a pair of cam plates or tracks 95 and 96, approximately semi-circular in shape and supported by studs 97, from the uprights 54 and 55, are adapted to engage the cam rollers 91, moving and holding the arms 90 inward during the engagement of the rollers with the faces 95a and 96a of the cam tracks. Thus with the rotation of shaft 56, the arms 90 are moved in and out so as to grasp the cartons riding on the upper conveyor and carry them in a semi-circular path. The arms are then released by the cam plates and the cartons are free to travel in a relatively inverted position on the lower conveyor 4.

*Lower conveyor*

Secured to the lower ends of uprights 54 and 55, bearing blocks 100 and 101 have journaled therein shaft 102, to which is fixed a sprocket 103 carrying chain 104, said chain being of the block type, and having affixed at desired intervals upstanding pins or studs 105. Bearing blocks 106 and 107, mounted on left-hand uprights 51 and 52, have journaled therein shaft 108 upon which sprocket 109 is fixed for driving chain 104.

As seen in Fig. 5, the shaft 108 has fixed at its right end a gear 110, driven by gear 111, fixed with sprocket 112 to rotate on a stud 113 secured in bearing block 106. The sprocket 112 is driven by chain 114, running over a larger sprocket 115 fixed to shaft 53, which itself is driven as previously explained.

In its travel from right-hand sprocket 103 to left-hand sprocket 109, the chain 104 is held in alignment by a channel or guide 116, which may be supported in any convenient manner, as by brackets or beams 117, which span the frame members 50 and 50a and are secured thereto at their outer ends.

Referring to Figs. 2 and 5, the studs 105 of chain 104 are adapted to engage the cartons and carry them to the left, past sealing rollers 5c and 5d, which seal the edges c and d of the cartons. While traveling on this lower conveyor, the cartons are also assisted by the members 61 of the upper conveyor, said members extending downward through this portion of their travel. Side guide rails 118 and 119 are provided for the cartons and chain 58, with the plates 60 of the upper conveyor serving as a top pressure member to prevent vertical displacement of the cartons as they contact the sealing rollers 5c and 5d.

*Take-off conveyor*

As seen in Fig. 2, the completely sealed cartons leave the machine at the left end of the lower conveyor. Here they may be received by a third or take-off conveyor to carry them to a packing table or other desired location.

The take-off conveyor chain 125, having uprights 126, is driven by sprocket 127, fixed on shaft 128, which is journaled in a pair of brackets or arms 129 extending from the frame members 50 and 50a. Fixed to shaft 128, a gear 130 meshes with gear 131, which, in turn, is fixed to a stub shaft 132, having at its outer end a sprocket 133 carrying chain 134, which is driven from a larger sprocket 135. As best seen in Fig. 5, the sprocket 135 is fixed to shaft 53, the driving means for which has been previously described.

During their travel from the lower conveyor onto the take-off conveyor, the cartons ride or slide upon a pair of rails 136, being carried along by the members 61 of the upper conveyor assembly.

*Sealing rollers and appurtenances thereof*

As before stated, the hermetically critical portions of a carton are at the edges of the overlapped end flaps. Referring to Fig. 1, the critical edge *a* is formed by three end flaps *e*, *f* and *g* continuous, respectively, with side walls E, F, and G.

I prefer to rotate the sealing rollers at a speed nearly sufficient to throw the sealing medium therefrom by the centrifugal force developed. Also, my sealing medium is of relatively extra heavy consistency. Thus when I bring one of the critical edges of a carton into contact with the surface of a roller, the sealing medium thereon is, in addition to being wiped from the roller, actually pushed and forced by its own momentum into whatever crevices or pin holes the carton may present. As seen in Fig. 7, the critical edge *a* is in contact with sealing roller 5*a* so that sealing medium thereon is transferred to the carton and forced into the crevices as shown in Fig. 9. Here the adhesive used in the primary sealing of the end flaps is indicated at P and my secondary or auxiliary sealing medium is shown at S entering and sealing the crevice *a'*, which, if not closed, may permit leakage by communicating with other crevices which, in turn, lead to the interior of the carton.

In conjunction with each sealing roller, an adjustable spring pessure device generally indicated at 150 is provided to bear against the carton and insure positive contact thereof with the sealing roller. Also a guard or shield (best seen in Figs. 6 and 7) is arranged to bear against the carton and prevent the sealing medium from creeping or being forced unnecessarily high thereon. A group of flat spring members indicated at 152 are employed to contact the sealed edge of the passing carton and wipe any surplus of sealing medium therefrom. Similar means 153 may also be utilized for secondary wiping so that any remaining surplus is completely removed to assist rapid drying of the sealed edge.

Referring to Figs. 3 and 4, the countershaft 78 already described, has fixed thereon miter gears 78*a* and 78*b*, driving gears 155 and 156, respectively. Gear 155 is fixed to shaft 157, which is journaled in the multiple bearing bracket 79, and other bearing brackets 157*a* and 157*b* fixed to the upright frame members 55 and 52, respectively. Fixed to shaft 157, the large sprocket 158*a* drives chain 159*a* running over an upper and smaller sprocket 160*a* fixed with sealing roller 5*a* on its shaft 161*a*. Also fixed to shaft 157, sprocket 158*d* carries chain 159*d* running over lower sprocket 160*d* fixed with sealing roller 5*d* on shaft 161*d*. Driven by miter gear 78*b* on countershaft 78, the miter gear 156 is fixed to shaft 162, which is journaled in the multiple bearing bracket 80 and other bearing brackets 162*a* and 162*b* fixed to upright frame members 54 and 51, respectively. Shaft 162 has fixed thereon sprocket 158*b*, with chain 159*b* for driving sprocket 160*b* fixed on shaft 161*b* with sealing roller 5*b*. The sealing roller 5*c* is driven in like manner by sprocket 158*c* and chain 159*c* running over sprocket 160*c*.

Referring to Figs. 4*a* and 6, the sealing roller 5*a* is fixed on shaft 161*a* journaled in end walls 165 and 166 of a reservoir or tank 167, which contains the sealing medium S and is mounted on the members 66 already described. A doctor blade 168, having extended end portions 168*a* and an upturned lip 169 with slot 169*a*, is held in desired relation to the roller by screws 170. Slots 171, through which the screws extend, allow adjustment of the doctor blade by means of the thumb screw 172 arranged as shown to enter the fixed nut 173. A spout 174 is provided for filling the tank.

Tank 167 has an outwardly turned lip 167*a*, in which a wiper blade 175 of flat spring material is mounted and arranged to wipe surplus sealing medium from the bottom of the cartons. A similar pair of blades 176 are fixed on the piece 177 for wiping the side of the cartons. The blades 175 and 176 comprise the primary wiping means 152 before mentioned, and material here scraped from the cartons runs back into the tank. Extending from the tank a bracket 178 has an upstanding member or post 179 from which additional scraper blades 180 and 181 are mounted to form the secondary wiping means 153 before mentioned. Material here scraped from the cartons may be reclaimed by use of drip pans not shown in the drawings.

The guard 151 has blade 183 of light spring material bent as at 183*a* and fastened by rivets 183*b* to the angle bar 184, said angle bar being threaded to receive screws 184*a* by which it is adjustably fixed in slots 185*a* of the angle bar 185. Angle bar 185 also has adjusting slots 185*b*, through which screws 185*c* extend to clamp the assembly to the carton guide rail 70.

The spring pressure means 150 consists of a series of flat springs 186 riveted to a member 187, having an angular bent lug 187*a* threaded to receive screws 187*b*, said screws being adjustably fixed to bracket 188 by means of slots 188*c*. The bracket 188 may be mounted by screws 188*b* to carton guide rail 69.

The appurtenances of the sealing roller 5*a* as above described are substantially duplicated in conjunction with the sealing rollers 5*b*, 5*c* and 5*d*, and it will be understood that like numerals throughout the drawings refer to like parts of the adjacent sealing roller.

The apparatus of Figs. 10 to 13, inclusive, as shown in application, Ser. No. 603,064, of which this application is a continuation in part, comprises a table 201 with legs 201*a*, having on its top transversely aligned bearings 202 near respective ends, for shafts 203 and 204, each having fixed on it a pair of transversely spaced sprocket wheels 205. Shaft 203 extends past its rear bearing 202 with a large grooved pulley 206 and a small grooved pulley 207 fixed on its extension; the latter pulley 207 having a belt 208 through which the machine is driven from a suitable source of power, not shown. The table has a slot 201*b* for these pulleys 206 and 207 and belt 208, and has slots 201*c* for the sprocket wheels 205. The other shaft 204 extends to the rear of its rear bearing 202 and has fixed on its extension the bevel gear 209, for which the table has a slot 201*d*.

Sprocket chains 210 run on the wheels 205, each having a series of lugs 211, and a bed bar 212 lies between the wheels 205 and between the chains 210 and extends past them at both ends; being fixed to a bottom plate 213 by screws 214. Channels 215 also are screwed to this plate 213 to guide the chains 210. The bottom plate 213 has legs 216 extending down, with vertical slots 217; and brackets 218 extend up from the table 201 with studs 219 through the respective leg slots 217 and having nuts 220 so that the plate 213 may be adjusted vertically at either end by set screws 221 passing up through the table 201 against the bottoms of the plate legs 216 and having locknuts 222.

Back guides 223 are supported on posts 224 to extend along to the rear of the chains 210; the posts 224 having lower extensions under the bed bar 212, to which they are secured by screws 225. These back guides 223 extend the full length of the machine. The front guides 226 are similarly mounted by posts 227 secured to the bed bar 212 by screws 228; these front guides 226 extending from the left end of the machine in front of the chains 210 and terminating near the right hand sprocket wheels 205, leaving a space for placing the cartons onto the bed bar 212 in the paths of the chain lugs 211, to be pulled between the guides 223 and 226 in proper alignment.

Four standards 229 are fixed to the table 1, two at its rear and two at its front edge, in two pairs aligned from front to rear, each pair having journaled in it a shaft 230 and each shaft 230 having fixed on it a drum 231. The pressure belt 232 runs around these drums 231 over the chains 210. The left hand shaft 230 has fixed on it a grooved pulley 233, and a belt 234 runs around this pulley 233 and around the large pulley 206 that is fixed on the sprocket wheel shaft 203 as before described. Each standard 229 has pivoted on it below the shaft 30 a pressure arm 235; each pair of arms 235 journaling a pressure roller 236 which is pulled down against the lower stretch of the pressure belt 232 by springs 237, one of which is stretched from each arm 235 down to a lower part of the respective standard 229. With the chains 210 and bed bar 212 adjusted to proper height by the means above described, the pressure belt 232 holds the cartons firmly thereon.

Midway between the two pairs of sprocket wheels 205, reservoirs 238 are fixed to the table 201 by foot extensions 238a, one reservoir at the front and the other at the rear of the chains 210. Each reservoir 238 has a spout-like extension 239 on its left side next to its top, and on its side next to the chain 210 has a boss 240 next to its bottom, and on its outer side, away from the chains 210, has an ear 241 extending up from its top, below which, in its wall, is a horizontal slot 242. In each reservoir 238 a disk 243 is fixed on a shaft 244 journaled transversely in the left and right hand walls of the reservoir and extending out to the right and having fixed on it a spur gear 245 meshing with a spur gear 246 turning on a stud 247 in the respective boss 240. These latter gears 246 of the two reservoirs mesh together as clearly seen in Fig. 11, so that the two disks 243 are operatively connected for rotation of each disk over toward the chains 210. At the rear, a spur pinion 248 meshes with the disk gear 245 and is fixed on a shaft 249 journaled in bearings 250 fixed on the table 201. Fixed on the other end of the shaft 249 is the bevel pinion 251 in mesh with the bevel gear 209 of the right hand sprocket wheel shaft 204, and before mentioned, which, driven by the chains 210 from the left hand shaft 203, drives the disks 243 in the proper directions as above explained.

For each disk 243 a scraper blade 252 extends in through the reservoir wall slot 242, being forked at its inner end to straddle the periphery of the disk, and having its outer end part bent up and straddling an adjusting screw 253 between collars 254 fixed on the screw, the screw being threaded through the ear 241 on the reservoir rim. On the left side of the top of each reservoir 238 is screwed a horizontal plate 255 extending in over the spout extension 239 and having fixed on its inner end two scrapers 256 and 257, extending in past the inner end of the plate 255 past the periphery of the disk 243. A third scraper 258 is fixed in the left or outer end of the spout extension 239 and extends up therefrom and inward past the ends of the other two scrapers 256 and 257. The latter incline to the left, in the direction of conveyance of the cartons, and the left hand one, 257, is narrower and does not project up as far as the right hand one 256. These two scrapers 256 and 257 are ordinarily required because the closure flaps are often slightly inclined from parallelism with the walls of the carton. If there was only one scraper it might be held away from the end wall by the edge of the closure flap so an extra scraper spaced slightly above the edge of the closure flap is ordinarily required. A third scraper 258 scrapes the bottom of the container. Material scraped from the carton runs back into the spout extension 239. The blade 252 is adjusted to control the amount of material carried up on the disk 243. Where the foot extensions 238a of the reservoirs are screwed to the table, they have front to rear slots 238b for the screws, so that each reservoir 238 may be adjusted toward or away from the chains 210. This permits each disk 243, carried by the reservoir, to be set so that its periphery passes very close to the path of travel of the respective lateral bottom edge of the carton, as carried by the chains 210 along the bed bar 212 by engagement of the chain lugs 211, and as held down by the pressure belt 232, as before described.

Operating in this manner, the part of the lateral side of the carton A scrapes from the periphery of the disk 243 a portion of the material B carried thereby, first taking some of this material B onto the advanced side of the corner $a$ at the meeting of the bottom $b$, transverse side $c$ and lateral side $d$. This material also covers the edge $e$ of the joints between the carton flaps, and the final portion scraped from the disk 243 protrudes slightly past the opposite corner $f$ at the meeting of the bottom $b$, opposite transverse side $g$ and the lateral side $d$. The scrapers 256 and 258 scrape all but a thin coating of the material from the bottom $b$ and side $d$, respectively, and the narrower intermediate scraper 257 bears its upper corner to the carton corner $a$, then along the joint edge $e$, and finally springs inward past the following corner $f$. It thus distributes the material around the corners $a$ and $f$, and the protrusion of the material into the small openings at these corners, before mentioned, is insured by the pressure of the scraper 257, which also better scrapes the slight recess along the joint edge $e$ to remove material that might have gathered therein to come therefrom after the carton has left the scrapers. It will be seen that the two reservoir devices thus operate on the two lower lateral edge parts of a carton simultaneously, completing the final sealing of that end of the carton as it is carried along.

This operation may be upon the bottom of an open-topped carton either before or after the carton has received its contents; or the carton may have been filled and had its top also closed before coming to my apparatus. After this operation upon one end, therefore, it passes to the left hand end of the bed bar 212, from which it may pass to the filling device if it was empty, or if filled but not closed, to the closing device which folds and secures the top flaps. If passed to a filler, it then passes to the top closing device. In either case, after its top is closed and adhesively secured by such device, the carton may be returned to my device, inverted, and thereupon have this other end subjected to the above-described operations according to my method; or another set of my apparatus may be arranged to receive the inverted carton from the final closing device to repeat the operations on this other end. If the carton is to be completely closed and hermetically sealed for filling by an air exclusion process as before referred to, it has both of its ends subjected to my process in the manner described, upon coming from the device that closes its two ends. The material B used from the reservoirs 238 may be like that with which the paper board of the carton is coated, but of course this is not essential, as any of the usual adhesives used in securing the flaps may be used.

Various other examples of apparatus suitable for carrying out my method might be shown, and it is to be understood that I am not limited to the examples shown, but what I claim as new and desire to secure by Letters Patent, is:—

1. Apparatus for sealing cartons comprising a sealing fluid liquid supply holder, a disc rotating in said holder to carry fluid on its periphery out of said holder, and a conveyor movable in a plane parallel with the axis of said disc for carrying cartons past said disc with their lower corners sufficiently close to said periphery to receive a portion of the sealing fluid therefrom.

2. Apparatus for sealing cartons comprising a holder for sealing fluid, a conveyor for carrying cartons with respect to said holder so that a corner of each carton passes in contact with a portion of the fluid, scrapers independently movable and in the paths of the respective surfaces of the carton adjacent to said corner, and a third scraper movable independently of the other two scrapers and in the path of said corner.

3. A machine for hermetically sealing crevices in closed cartons occurring along the meeting edges of closure flaps of said cartons, which comprises means for moving cartons in a direction parallel with the edges thereof, and mechanical means for forcing a sealing medium crosswise of said edges into said crevices during the movement thereof, and means for restricting the forcing of the sealing medium exclusively to said edges.

4. A machine for hermetically sealing crevices in closed cartons occurring along the meeting edges of closure flaps of said cartons, which comprises means for moving cartons in a direction parallel with the edges thereof, and mechanical means for forcing a sealing medium crosswise of said edges into said crevices during the movement thereof, means for restricting the forcing of the sealing medium exclusively to said edges, and means for exerting pressure against the sides of the cartons opposite to the edges having the crevices into which the adhesive is forced.

5. A machine for hermetically sealing cartons in which crevices are developed along the edges and corners incident to the sealing of closure flaps of said cartons comprising a conveyor for continuously moving cartons, mechanical means for applying plugging and sealing medium into the crevices during the movement thereof, and means for diverting the application of the said medium substantially to the corners and edges of said closure flaps.

6. A machine for use in combination with a machine provided with means for folding flexible parts of cartons wherein crevices are formed adjacent to said folded parts comprising a continuously operative carton conveyor, and mechanical means for forcing plugging and sealing medium into the crevices at the lower corner edges thereof during the continuous conveying of said cartons, said means comprising a supply reservoir for said medium, and means for forcing said medium therefrom into the crevices of said folded parts, comprising an adhesive feeding roller mounted on an axis which extends substantially parallel with the plane of movement of said conveyor.

7. A machine for use in combination with a machine provided with means for folding flexible parts of cartons wherein crevices are formed adjacent to said folded parts comprising a continuously operative carton conveyor, and mechanical means for forcing plugging and sealing medium into the crevices at the lower corner edges thereof during the continuous conveying of said cartons, said means comprising a supply reservoir for said medium, means for forcing said medium therefrom into the crevices of said folded parts, and means for shielding said medium from uncreviced portions of said cartons.

8. A machine for use in combination with a machine provided with means for folding flexible parts of cartons wherein crevices are formed adjacent to said folded parts comprising a continuously operative carton conveyor, mechanical means for forcing plugging and sealing medium into the crevices at the lower corner edges thereof during the continuous conveying of said cartons, said means comprising a coating roller mounted on an axis which extends parallel to the plane of movement of said conveyor, and means for applying pressure to said cartons counter to the direction in which the said medium is forced into the crevices.

9. A machine for use in combination with a machine provided with means for folding flexible parts of cartons wherein crevices are formed adjacent to said folded parts comprising a continuously operative carton conveyor, and mechanical means for forcing plugging and sealing medium into the crevices during the continuous conveying of said cartons, said means comprising a supply reservoir for said medium, means for forcing said medium therefrom into the crevices of said folded parts, means for shielding said medium from uncreviced portions of said cartons, and means for wiping off excessive applications of the plugging and sealing adhesive.

10. A machine for use in combination with a machine provided with means for folding flexible parts of cartons wherein crevices are formed adjacent to said folded parts, comprising mechanical means for forcing sealing and plugging medium into the crevices incident to successive conveying movement of cartons one after another, and means for shielding said medium from uncreviced portions of said cartons.

11. A machine for use in combination with a carton conveying machine provided with means for folding flexible parts of cartons during the conveying movement wherein crevices are formed adjacent to said folded parts, comprising mechanical means for forcing sealing and plugging medium at right angles to their direction of movement into the crevices at the lower corner edges thereof incident to successive conveying movement of cartons one after another, and means for applying pressure to said cartons counter to the direction in which the said medium is forced into the crevices.

12. A machine for use in combination with a machine provided with means for folding flexible parts of cartons wherein crevices are formed adjacent to said folded parts, comprising mechanical means for forcing sealing and plugging medium into the crevices incident to successive conveying movement of cartons one after another, means for shielding said medium from uncreviced portions of said cartons, and means for wiping off excessive applications of the plugging and sealing medium.

SAMUEL BERGSTEIN.